(12) United States Patent
Ahmed

(10) Patent No.: US 11,235,514 B1
(45) Date of Patent: Feb. 1, 2022

(54) HIGH FLEXIBLE SANDWICH PANEL MADE OF GLASS FIBRE REINFORCED NYLON WITH SUPER ELASTIC RUBBER CORE USING FUSED FILAMENT FABRICATION (FFF)

(71) Applicant: United Arab Emirates University, Al Ain (AE)

(72) Inventor: Waleed Khalil Ahmed, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/137,799

(22) Filed: Dec. 30, 2020

Related U.S. Application Data

(62) Division of application No. 17/026,968, filed on Sep. 21, 2020, now Pat. No. 10,974,444.

(51) Int. Cl.
*B29C 64/118* (2017.01)
*B29C 64/393* (2017.01)
(Continued)

(52) U.S. Cl.
CPC .......... *B29C 64/118* (2017.08); *B29C 64/393* (2017.08); *B32B 25/10* (2013.01);
(Continued)

(58) Field of Classification Search
None
See application file for complete search history.

(56) References Cited

U.S. PATENT DOCUMENTS 5,690,378 A * 11/1997 Romesburg .......... B62D 29/046
296/181.3
9,511,543 B2 12/2016 Tyler
(Continued)

FOREIGN PATENT DOCUMENTS

CN 104086891 A 10/2014
CN 109352985 A 2/2019
(Continued)

OTHER PUBLICATIONS

Kentaro Sugiyama, "3D Printing of Composite Sandwich Structures Using Continuous Carbon Fiber and Fiber Tension", Journal, 2018, 1-23, Composites: Part A.
(Continued)

*Primary Examiner* — Monica A Huson
*Assistant Examiner* — Kelsey C Grace
(74) *Attorney, Agent, or Firm* — Hayes Soloway PC

(57) ABSTRACT

A method for manufacturing a hyper-elastic three-dimensional (3D) sandwich panel is disclosed, the method comprising printing a plurality of layers, the plurality of layers comprising a central composite core and upper and lower sandwich face layers; and regulating a temperature of each printed layer to match melting point temperature of a consecutive layer being subsequently printed on top of a previously printed layer, wherein the plurality of layers are printed one layer at a time. The multi-layered and multi-material hyper-elastic three-dimensional (3D) sandwich panel is a central composite rubber core stacked between upper and lower sandwich face layers made of reinforced glass-fiber, wherein the central composite rubber core further comprises a core lower face layer, a central core layer and a core upper face layer.

13 Claims, 5 Drawing Sheets

(51) Int. Cl.
  *B33Y 70/10* (2020.01)
  *B32B 25/10* (2006.01)
  *B33Y 10/00* (2015.01)
  *B33Y 50/02* (2015.01)
  *B33Y 80/00* (2015.01)
  *B29L 9/00* (2006.01)
  *B29L 7/00* (2006.01)
  *B29K 309/08* (2006.01)

(52) U.S. Cl.
  CPC ............... *B33Y 10/00* (2014.12); *B33Y 50/02* (2014.12); *B33Y 70/10* (2020.01); *B33Y 80/00* (2014.12); *B29K 2309/08* (2013.01); *B29L 2007/002* (2013.01); *B29L 2009/00* (2013.01); *B32B 2262/101* (2013.01); *B32B 2262/106* (2013.01)

(56) References Cited

U.S. PATENT DOCUMENTS

| | | |
|---|---|---|
| 9,688,028 B2 | 6/2017 | Mark |
| 2014/0291886 A1 | 10/2014 | Mark et al. |
| 2016/0192741 A1 | 7/2016 | Mark et al. |
| 2016/0297104 A1 | 10/2016 | Guillemette et al. |
| 2016/0346997 A1 | 12/2016 | Lewis et al. |
| 2018/0186079 A1 | 7/2018 | Vilajosana et al. |
| 2018/0243984 A1* | 8/2018 | Hayashida ............ B29C 64/393 |
| 2018/0373227 A1* | 12/2018 | Sadusk .............. G05B 19/4099 |

FOREIGN PATENT DOCUMENTS

| | | |
|---|---|---|
| CN | 109854939 A | 6/2019 |
| WO | 9748557 A2 | 12/1997 |
| WO | 2015077262 A1 | 5/2015 |
| WO | 2015090265 A1 | 6/2015 |
| WO | 2016022449 A1 | 2/2016 |

OTHER PUBLICATIONS

H. Yazdani Sarvestani, "3D Printed Meta-Sandwich Structures: Failure Mechanism, Energy Absorption and Multi-Hit Capability", Journal, 2018, 1-47, Materials & Design.

* cited by examiner

| Heating printing bed 114 up to 30% of the melting point of the Material used in the sandwich lower face 111 (with temperature T2) |
|---|
| Heating active FDM Nozzle 1 103 to temperature TN1 and printing over the bed 114 (with temperature T1) with a linear infill type |

| Heating FDM Nozzle 2 104 with temperature TN2 to 50% of the melting point of the material used in the core lower face layer 110 (with temperature T3) |
|---|
| FDM Nozzle 1 103 moves to a stand by position once the sandwich lower face 111 is printed |

| Sandwich lower face 111 (at temperature T2) is left to cool down until temperature T2 approaches 50% of the core lower face layer 110 melting temperature T3 |
|---|
| A bonding agent is sprayed over the sandwich lower face 111 prior to printing the core face layer 110 - for additional adhesion strength between the materials being used |

| FDM Nozzle 2 104 continues to heat up until approaching core lower face layer 110 melting temperature T3, and starts printing over the sandwich lower face 111 with a linear infill style. |
|---|
| Subsequent to completion of printing the core lower face layer 110, FDM Nozzle 2 104 proceeds to print the rubber-like composite central core 108 with temperature T4, which is equal to T3 and an infill core. |

| Once the Central core 108 is printed, FDM Nozzle 2 104 proceeds to print core upper face layer 106 with a linear infill at temperature T3 which is equal to T4. |
|---|
| Prior to the completion of printing the core upper face layer 106, FDM Nozzle 1 103 with temperature TN1 is heated to 50% of the melting point of the material to be used in the sandwich upper face layer 110 (with temperature T2) |

| FDM Nozzle 2 104 moves to a stand by position once the core upper face layer 106 is printed |
|---|
| The core upper face layer 106 (at temperature T3) is also left to cool down until temperature T2 approaches 50% of the sandwich upper face 105 melting temperature T2 |

| FDM Nozzle 1 103 proceeds to print the sandwich upper face 105 |
|---|
| FDM Nozzle 1 103 stops printing moves to a stand by position and gradually cools down |

FIG. 6

HIGH FLEXIBLE SANDWICH PANEL MADE OF GLASS FIBRE REINFORCED NYLON WITH SUPER ELASTIC RUBBER CORE USING FUSED FILAMENT FABRICATION (FFF)

CROSS-REFERENCE TO RELATED APPLICATIONS AND PRIORITY

This patent application is a Divisional of U.S. patent application Ser. No. 17/026,968 filed Sep. 21, 2020. This patent application is herein incorporated by reference in its entirety.

FIELD OF THE INVENTION

The present invention relates to a hyper elastic sandwich structure manufactured using Fused deposition modeling (FDM), and more particularly a method for manufacturing a multi-layered multi-material composite sandwich structure.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Fused deposition modeling (FDM) is one of the most widely used additive manufacturing processes for fabricating prototypes and functional parts in common engineering plastics. The process is based on the extrusion of heated feedstock plastic filaments through a nozzle tip to deposit layers onto a platform to build parts layer by layer directly from a digital model of the part. The simplicity, reliability, and affordability of the FDM process have resulted in the additive manufacturing technology to be widely recognized and adopted by industry, academia, and consumers. The FDM process has also been widely used by research and development sectors to improve traditional processes, to develop new materials, and apply FDM systems in a wide range of engineering applications.

Polycaprolactone (PCL), a medical-grade thermoplastic polyurethane, is generally used in FDM for scaffold production. PCL is preferred due to its high decomposition temperature and low glass transition. Therefore, the application of this method to biodegradable polymers except PCL is limited. Besides, incorporation of cells or biological factors in the overall procedure is avoided owing to the high operational temperatures.

One of the biggest challenges of 3D printing is printing with flexible materials like rubber. Rubber is an organic material whose properties cannot be influenced by external factors. The fact that rubber undergoes vulcanization to improve its elasticity and strength implies that it can never again re-exist in a fluid state. Initially, printing flexible filaments caused designers a lot of trouble, considering that the filaments were too soft, and whenever passed through a 3D printer, printing did not occur as expected. Most of the extruders used had a pushing string effect. Whenever a filament with no rigidity was pushed towards the nozzle, the filament bent or twisted because it was too soft. Flexible, rubber-like filaments include all such filaments coming from various manufacturers. The formulas for these filaments vary from one manufacturer to another, and this results in printing stacked layers of different materials to be a challenging task.

Apart from flexible filaments, flexible resin is also traditionally used to produce rubber-like prints (for developing or prototyping highly precise flexible parts). When printed, flexible resin feels just like rubber and normally compresses and is capable of bouncing back to original form. However, a main drawback is that resins are normally designed for specific printers and there is no compatibility of rubber-like material (such as TPU95A) with polymeric materials owing to adhesion problems, as shown in the below table:

|  | PLA | Tough PLA | ABS | Nylon | CPE | CPE+ | PC | TPU 95A | PP | PVA | Breakaway |
|---|---|---|---|---|---|---|---|---|---|---|---|
| PLA | ✓ | E | x | x | x | x | x | x | x | ✓ | ✓ |
| Tough PLA |  | ✓ | x | x | x | x | x | x | x | ✓ | ✓ |
| ABS |  |  | ✓ | x | x | x | x | E | x | E | ✓ |
| Nylon |  |  |  | E | x | x | x | E | x | ✓ | ✓ |
| CPE |  |  |  |  | ✓ | x | x | x | x | ✓ | ✓ |
| CPE+ |  |  |  |  |  | E | x | x | x | E | ✓ |
| PC |  |  |  |  |  |  | E | E | x | x | E |
| TPU 95A |  |  |  |  |  |  |  | E | x | E | E |
| PP |  |  |  |  |  |  |  |  | E | x | x |
| PVA |  |  |  |  |  |  |  |  |  | x | x |
| Breakaway |  |  |  |  |  |  |  |  |  |  | x |

✓—Officially supported
E—Experimental
x—Not supported

Accordingly, there exists a need for a solution for the above explained issues, and for a sandwich panel that overcomes the drawbacks faced by traditional products and a method of manufacturing the same.

SUMMARY OF THE INVENTION

Therefore, it is an object of the present invention to develop a multi-layered, multi-material composite sandwich structure which overcomes drawbacks faced by traditional products.

In an aspect of the invention, the present invention relates to a method for manufacturing a hyper-elastic three-dimensional (3D) sandwich panel, the method comprising the steps of printing a plurality of layers, the plurality of layers comprising a central composite core and upper and lower sandwich face layers; and regulating a temperature of each printed layer to match melting point temperature of a consecutive layer being subsequently printed on top of a previously printed layer, wherein the plurality of layers are printed one layer at a time.

In an embodiment of the present invention, 3D printing fusion deposition modelling (FDM) technology is used for manufacturing the hyper-elastic 3D sandwich panel.

In another embodiment of the present invention, the central composite core is a rubber core stacked between the upper and lower sandwich face layers made of reinforced glass-fiber.

In another embodiment of the present invention, the central composite core further comprises a core lower face layer, a central core layer and a core upper face layer.

In another embodiment of the present invention, the method further comprises spraying a bonding agent over the lower sandwich face layer prior to printing the core lower face layer for achieving additional adhesion strength between various materials being used in the plurality of layers.

In another embodiment of the present invention, the hyper-elastic 3D sandwich panel comprises multiple core layers stacked in between upper and lower sandwich face layers.

In another embodiment of the present invention, a non-contact digital laser infrared thermometer temperature gun is used for measuring temperature of the central composite core, and for ensuring that the central composite core has attained a desired temperature prior to proceeding with printing of the consecutive layer.

In another embodiment of the present invention, a thermal camera or IR thermometer with laser pointers is used for monitoring and thereby regulating temperature of each layer being printed and for determining as to when printing should stop or resume.

In another embodiment, a control screen is used to set a temperature of a material being used for printing prior to commencement of the printing, and is connected to a thermal camera controller and a 3D printer controller.

In another embodiment of the present invention, two FDM extruder nozzles are used for 3D printing the plurality of layers, one layer at a time.

In another embodiment of the present invention, the method further comprises the steps of:
heating a printing bed to 30% of the melting point of a material used in the lower sandwich face layer;
heating a first FDM nozzle and printing the lower sandwich face layer with a linear infill type;
allowing the first FDM nozzle to cool down subsequent to printing the lower sandwich face layer and heating a second FDM nozzle;
allowing the lower sandwich face layer to cool down until temperature approaches 50% of the melting point of a material used in the core lower face layer;
printing the core lower face layer over the lower sandwich face layer using the second FDM nozzle;
printing the composite central core over the core lower face layer using the second FDM nozzle;
printing the core upper face layer over the core lower face layer using the second FDM nozzle with a linear infill type;
allowing the second FDM nozzle to cool down subsequent to printing the core upper face layer and heating the first FDM nozzle;
allowing the core upper face layer to cool down until temperature approaches 50% of the melting point of a material used in the upper sandwich face layer;
printing the upper sandwich face layer over the core upper face layer using the first FDM nozzle; and
allowing the first FDM nozzle to cool down subsequent to printing the upper sandwich face layer.

In another embodiment of the present invention, the second FDM nozzle is heated to 50% of the melting point of the material used in the core lower face layer.

In yet a further aspect of the invention is disclosed, a multi-layered and multi-material hyper-elastic three-dimensional (3D) sandwich panel comprising a central composite rubber core stacked between upper and lower sandwich face layers made of reinforced glass-fiber.

In an embodiment of the present invention, the central composite rubber core further comprises a core lower face layer, a central core layer and a core upper face layer.

In another embodiment of the present invention, the core lower face layer, the central core layer and the core upper face layer are made of rubber or a flexible rubber-like material, to ensure hyper elasticity properties and an ability to maintain shape when no load is placed on the 3D sandwich panel.

In another embodiment of the present invention, the lower and upper sandwich face layers are made of reinforced materials such as fiber glass or carbon fiber reinforced polymers.

In another embodiment of the present invention, a transition layer is present in between the upper sandwich face layer and the central composite rubber core for enhancing adhesion characteristics between the upper sandwich face layer and the central composite rubber core.

In another embodiment of the present invention, an interfacial surface between the transition layer and a surface of the core upper face layer comprises a low infill density of 10% to 50%.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 6 is a flow chart depicting the manufacturing process of a multi-layered and multi-material hyper elastic sandwich panel using 3D printing technology fusion deposition modelling (FDM), in accordance with the present invention.

DETAILED DESCRIPTION OF THE INVENTION

Figure 1:
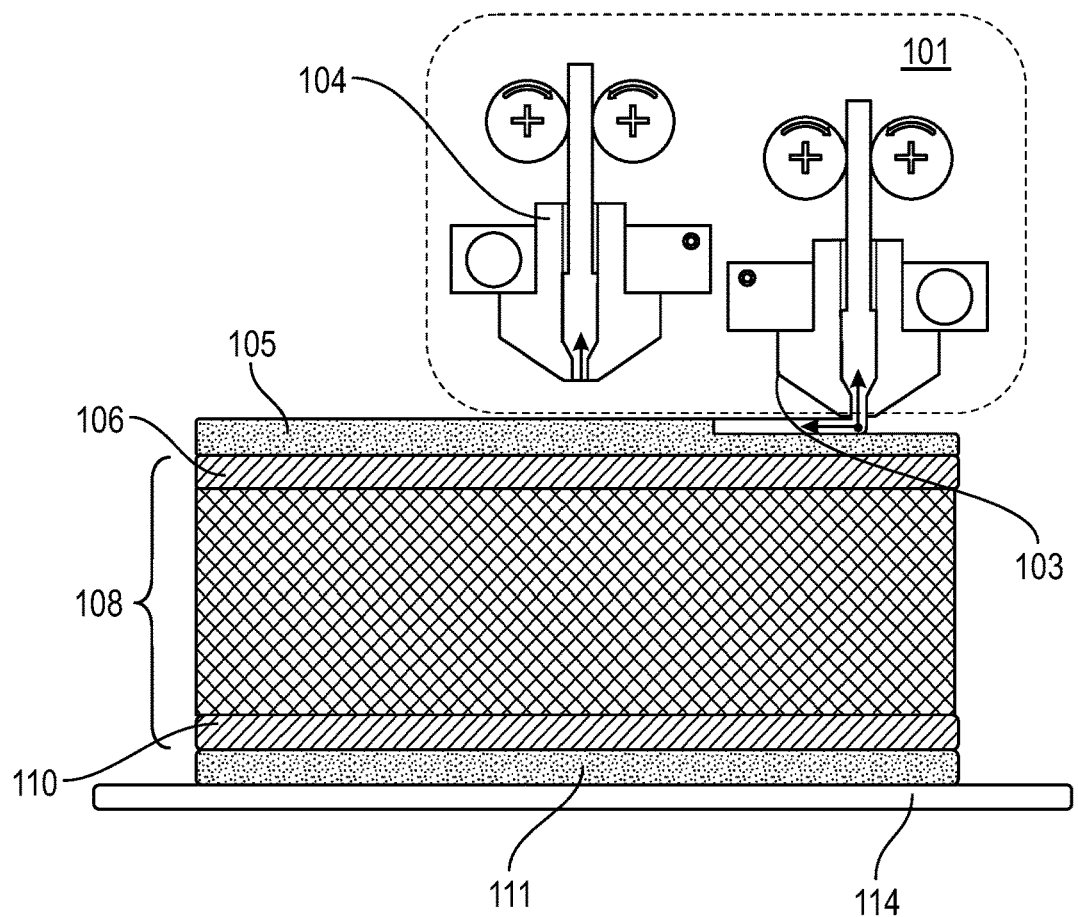
FIG. 1 illustrates a single core composite hyper elastic sandwich panel in accordance with the present invention.

The aspects of a multi-layered, multi-material composite sandwich structure according to the present invention will be described in conjunction with FIGS. 1-7. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Fusion Deposition Modelling (FDM) is a production method used for fabrication, production applications, and mechanical system modeling. The technique produces a tissue scaffold by a melt extrusion method which makes use of a layer-by-layer thermoplastic polymer. FDM utilizes a moving nozzle to extrude a fiber of polymeric material (x- and y-axis control) from which a physical model is built layer-by-layer. FDM technique has several advantages compared to other 3D printing technologies, such as absence of any unbound loose powder and elimination of any kind of solvent removal process.

The proposed invention aims at manufacturing a multi-layered and multi-material hyper elastic sandwich panel using 3D printing technology fusion deposition modelling (FDM) also known as fused filament fabrication. FDM 3D printing works both horizontally and vertically, using an extrusion nozzle which moves over a platform. The process involves the use of thermoplastic material that reaches melting point and is then forced out for creating a 3D object layer by layer. The sandwich panel in accordance with the present invention, includes a rubber-like core which provides a required elasticity and is stacked between two layers—upper and lower layers made of glass-fiber reinforced nylon. The present invention deals with a product and method for manufacturing the product. Owing to differences in melting point and adhesion characteristics, traditionally, 3D FDM printing was unable to effectively perform using rubber-like material stacked on polymeric material. Accordingly, multiple tests were conducted to identify a better and more successful method for the same, resulting in the hyper elastic sandwich panel made with a rubber core and glass-fiber reinforced upper and lower layers.

This unique combination provides the product with hyper elasticity, and the ability to maintain shape even when no load is placed. In another embodiment of the present invention, a method of the manufacturing is proposed for building multi-layered sandwich panels with numerous rubber-like cores that have superior properties (considering the combination of super flexibility with upper and lower faces).

Various properties of the hyper elastic sandwich structure in accordance with the present invention include that the central composite core includes three main components namely, the core lower face layer 110, the central core 108 and the core upper face layer 106. All these three layers are made of rubber or any other high flexible rubber-like material. Further, the lower and upper sandwich face layers are made of reinforced material such as fiber glass or carbon fiber reinforced polymers like nylon or polylactic acid (PLA) reinforced with randomized particles or unidirectional glass or carbon fiber. Properties such as length and thickness of the sandwich layers depend on the required overall stiffness. In another embodiment of the present invention, infill properties pertaining to the rubber-like central core 108 depend on the hyper elasticity property of the core. However, the infill type must always be linear style for excellent adhesion properties between interfacial layers when transitioning between the core lower face layer 110 to central core 108 and then from the central core 108 to the core upper face layer 106.

In another embodiment, a non-contact digital laser infra-red thermometer temperature gun is used for measuring temperature of the rubber-like central core 108, to ensure that the central core has attained the desired temperature prior to proceeding with printing of the next sandwich layer.

FIG. 1 illustrates a single core composite hyper elastic sandwich panel in accordance with the present invention. In FDM, an extruder nozzle deposits material along the toolpath, fusing it to previous layers in order to build a three-dimensional body, thus being called Fused Deposition Modeling. The manufacturing process commences by initially heating the printing bed 114 up to 30% of the melting point of the material used in the sandwich lower face layer 111 (with temperature T2). This is followed by heating the active FDM Nozzle 1 103 to temperature $T_{N1}$ and printing over the bed 114 (with temperature T1) with a linear infill type. Infill is a repetitive structure used to fill up space inside an otherwise empty 3D print. For the majority of prints, infill is hidden from view (however possesses numerous patterns, designs and orientations). The infill also enables printers to print flat horizontal edges over empty space reliably and efficiently without which 3D prints will fail to have sufficient structure or stability, and will be fragile. Prior to the completion of printing the sandwich lower face 111, FDM Nozzle 2 104 with temperature TN2 is heated to 50% of the melting point of the material used in the core lower face layer 110 (with temperature T3).

Once the sandwich lower face 111 is printed, FDM Nozzle 1 103 moves to a stand by position or condition and gradually cools down with the help of a cooling fan. The sandwich lower face 111 (at temperature T2) is also left to cool down by natural convection or a fan until temperature T2 approaches 50% of the core lower face layer 110 melting temperature T3. Temperature may be measured manually or by using a thermal cameral 112 integrated with the 3D printer to control the overall cooling process and thereby when the printing process may resume. In an embodiment of the present invention, a bonding agent is sprayed over the sandwich lower face 111 prior to printing the core lower face layer 110—for additional adhesion strength between the materials being used. Hence, FDM Nozzle 2 104 continues to heat up until approaching core lower face layer 110 melting temperature T3, and starts printing over the sandwich lower face 111 with a linear infill style.

Subsequent to completion of printing the core lower face layer 110, FDM Nozzle 2 104 proceeds to print the rubber-like composite central core 108 with temperature T4, which is equal to T3 and an infill core. The infill may be, but not limited to any one of linear, honeycomb, triangular or concentric, depending on individual and respective design requirements. Once the central core 108 is printed, FDM Nozzle 2 104 proceeds to print core upper face layer 106 with a linear infill at temperature T3 which is equal to T4. Prior to the completion of printing the core upper face layer 106, FDM Nozzle 1 103 with temperature $T_{N1}$ is heated to 50% of the melting point of the material to be used in the sandwich upper face layer 110 (with temperature T2). Once the core upper face layer 106 is printed, FDM Nozzle 2 104 moves to a stand by position or condition and gradually cools down with the help of a cooling fan. The core upper face layer 106 (at temperature T3) is also left to cool down by natural convection or a fan until temperature T2 approaches 50% of the sandwich upper face 105 melting temperature T2. Temperature may be measured manually or by using a thermal camera 112 integrated with the 3D printer to control the overall cooling process and thereby when the printing process may resume. In an embodiment of the present invention, a bonding agent is sprayed over the various face layers for additional adhesion strength between the materials being used.

Figure 2:
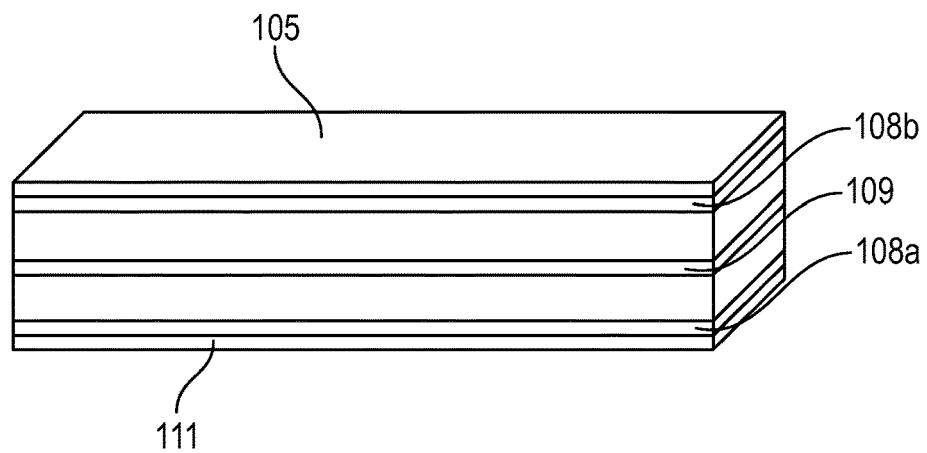
FIG. 2 depicts a hyper elastic rubber-like composite core sandwich panel with 2 core layers in accordance with the present invention.
Figure 3:
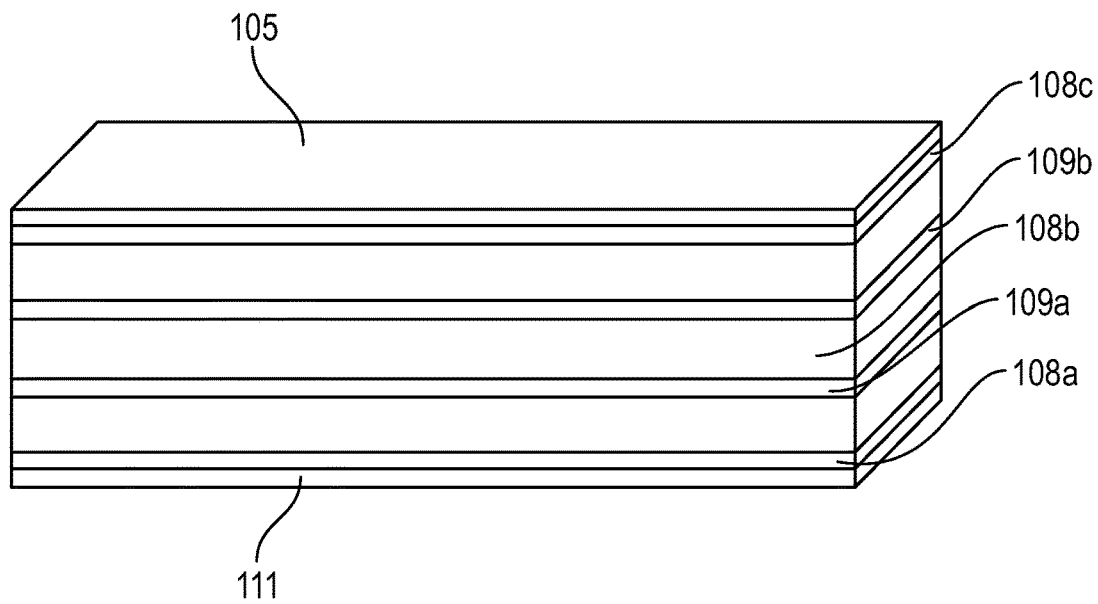
FIG. 3 depicts a hyper elastic rubber-like composite core sandwich panel with 3 core layers in accordance with the present invention.

FDM Nozzle 1 103 proceeds to print the sandwich upper face 105. Subsequent to printing of the sandwich upper face 105, FDM Nozzle 1 103 stops printing moves to a stand by position or condition and gradually cools down with the help of a cooling fan. The method in accordance with the present invention is also used to manufacture hyper elastic rubber-like composite core sandwich panels with multiple cores (2 or more core layers) as shown in FIGS. 2 and 3, comprising a single layer or a core mid-face layer 109 between the first and second core layers 108a and 108b, to provide an interfacial zone between the rubber-like core layers and the glass-fiber reinforced upper and lower sandwich faces 105 and 111. FIG. 3 depicts hyper elastic rubber-like composite core sandwich panels with 3 core layers 108a-108c, and two core mid-face layers 109a and 109b.

Figure 4:
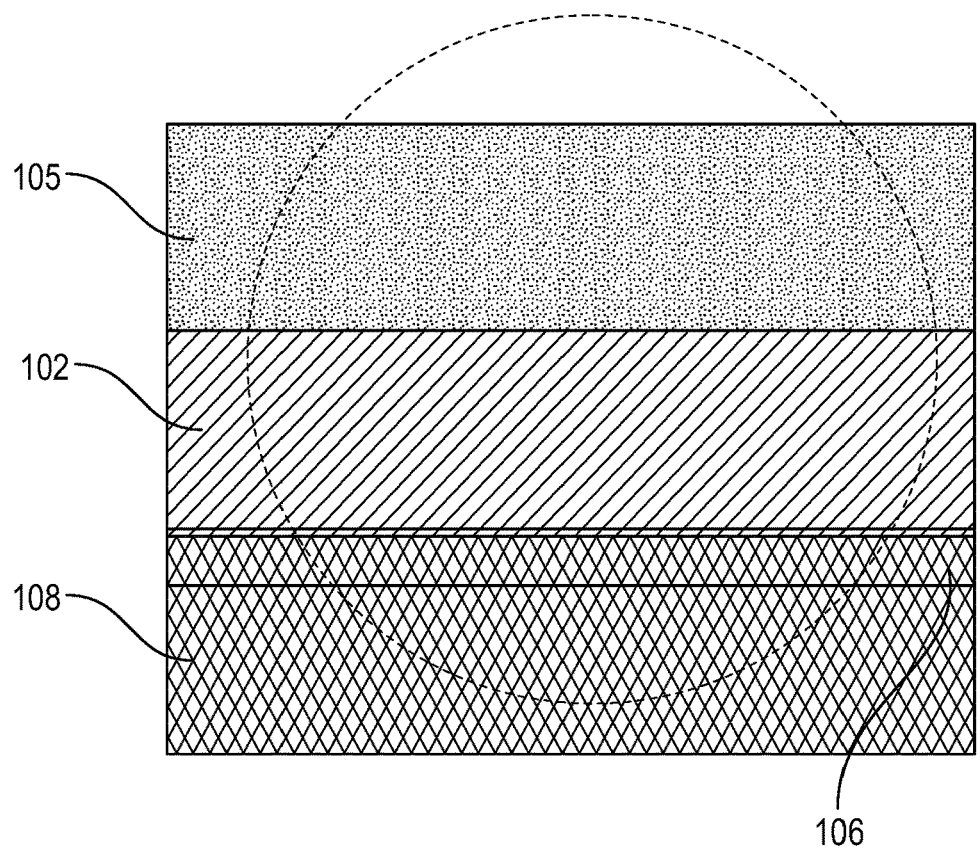
FIG. 4 shows positioning of a transition layer in accordance with the present invention.

In an embodiment of the present invention, and as shown in FIG. 4, a transition layer 102 is present in between the sandwich upper face 105 and the central core 108. Interfacial surface between the transition layer 102 and surface of the core upper face layer 106 includes a low infill density of 10% to 50%. Two different combinations of infill structures are used to offer more contact surface to secure adhesion. Printing process of the sandwich upper face 105 cannot be done without following the temperature requirements of the manufacturing process described above. Prior to printing the sandwich upper face 105, a chemical agent is sprayed over the upper surface of the transition layer 102 (for increased adhesion strength). The same conditions are applied for the interfacial surface between the transition layer 102 and the surface of the upper core layer 106. The proposed method of manufacturing the multi-layered, multi-material composite sandwich structure includes preparing or building the various layers individually for any kind of material combination. Special consideration in the proposed method is given to ensure proper adhesion characteristics between the various layers being printed.

The proposed invention uses a plurality of traditional nozzles for printing and stacking the various independent layers of the sandwich structure. Further, the proposed method comprises a temperature control system for monitoring and controlling overall temperature of the printing process, particularly measuring temperature of the last printed layer of a specific material, in order to prepare the last printed layer for printing the next different material to be stacked over the previous layer, in order to ensure proper adhesion. Also, there is a transition layer 102 present in the proposed structure, which further enhances proper adhesion characteristics between the polymeric material and the rubber-like material through monitoring and controlling temperature of the interfacial surface between the transition layer 102 and the rubber-like core layer 108. Temperature control is done manually or by using a closed-loop thermal camera 112.

The proposed product (multi-layered, multi-material composite sandwich structure) using polymeric material for the sandwich faces and rubber material for the core is tested for various properties, wherein the product manufactured by FDM process displayed hyper-elastic properties subsequent to the test, as the product was shown to recover its original shape after removing an applied load. The primary objectives of this product include providing ordinary users a cheap and practical method for manufacturing a composite sandwich with a rubber core using FDM 3D printing technology. Further, the end-product which is a hyper flexible sandwich panel with a central rubber core and covered with composite layers—has numerous industrial applications in the construction, automobile, aerospace and marine fields.

Figure 5:
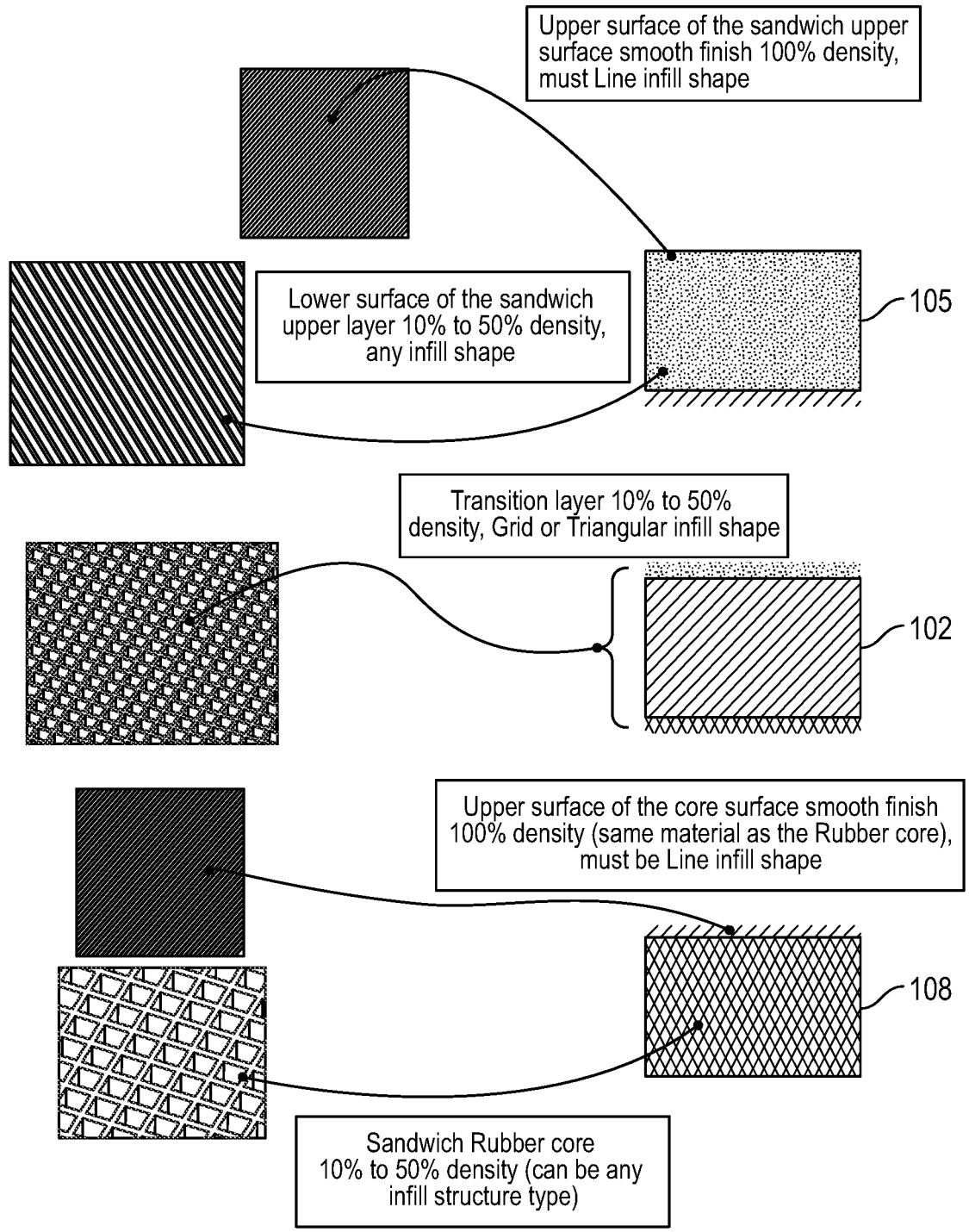
FIG. 5 shows various infill types and layer densities of the multi-layered, multi-material composite sandwich structure in accordance with the present invention.

FIG. 5 shows various infill types and layer densities of the multi-layered, multi-material composite sandwich structure in accordance with the present invention. The upper surface of the sandwich upper face 105 has 100% density and line infill type, and the lower surface of the sandwich upper face 105 has 10-50% density and consists of any infill type. The transition layer 102 also has 10-50% density and consists of grid or triangular infill type. Further, the upper surface of the central core 108 has a smooth finish with 100% density (same material as the rubber core) with line infill type. The sandwich rubber core 108 has 10-50% density and consists of any infill type.

FIG. 6 is a detailed flow chart depicting the steps in the manufacturing process of a multi-layered and multi-material hyper elastic sandwich panel using 3D printing technology fusion deposition modelling (FDM), in accordance with the present invention. As a first step, the printing bed 114 is heated up (to 30% of the melting point of the material used in the sandwich lower face layer 111). This is followed by heating active FDM Nozzle 1 103 (to temperature TN1) and printing over the printing bed 114 with a linear infill type. In the next step, FDM Nozzle 2 104 is heated up (to 50% of the melting point of the material used in the core lower face layer 110). Once the sandwich lower face 111 is printed, FDM Nozzle 1 103 moves to a stand by position or condition and gradually cools down with the help of a cooling fan. The sandwich lower face 111 (at temperature T2) is also left to cool down by natural convection or a fan until temperature T2 approaches 50% of the core lower face layer 110 melting temperature T3. FDM Nozzle 2 104 continues to heat up until approaching the desired core lower face layer 110 melting temperature, and starts printing over the sandwich lower face 111 with a linear infill style.

In the next step, subsequent to completion of printing the core lower face layer 110, FDM Nozzle 2 104 proceeds to print the rubber-like composite central core 108. Once the central core 108 is printed, FDM Nozzle 2 104 proceeds to print core upper face layer 106 with a linear infill. Prior to the completion of printing the core upper face layer 106, FDM Nozzle 1 103 is heated (to 50% of the melting point of the material to be used in the sandwich upper face layer 110). Once the core upper face layer 106 is printed, FDM Nozzle 2 104 moves to a stand by position or condition and gradually cools down with the help of a cooling fan. The core upper face layer 106 (at temperature T3) is also left to cool down by natural convection or a fan until temperature T2 approaches 50% of the sandwich upper face 105 melting temperature T2. In the next step, FDM Nozzle 1 103 proceeds to print the sandwich upper face 105. Subsequent to printing of the sandwich upper face 105, FDM Nozzle 1 103 stops printing moves to a stand by position or condition and gradually cools down with the help of a cooling fan.

Figure 7:
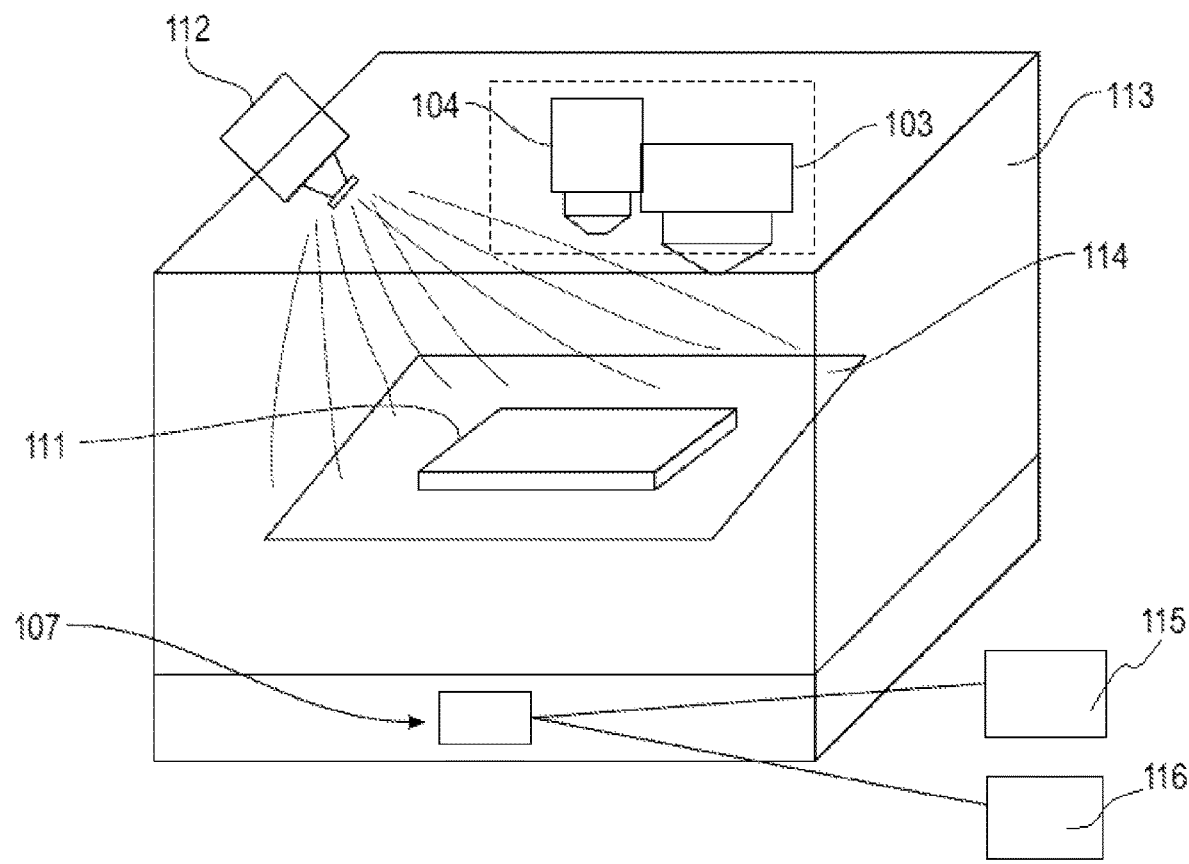
FIG. 7 depicts the thermal camera or IR thermometer with laser pointers in accordance with the present invention.

The present system produces a multilayer sandwich instead of a composite material including a filler mixed with a polymer. FIG. 7 depicts the thermal camera or infrared (IR) thermometer with laser pointers 112 in accordance with the present invention, integrated with the 3D printer to control the overall cooling process of each layer and determine as to when the printing should stop or resume. Also shown in FIG. 7 is a 3D printer frame 113 and a control screen 107. The control screen 107 is used to set a temperature of the used material used in the 3D printing process prior to commencement of any printing, and is connected to a thermal camera controller 115 and a 3D printer controller 116. The thermal camera or IR thermometer sensor 112 measures the top surface temperature of a 3D printed layer, and triggers sending of an order (a signal) to the 3D printer controller 116 in case the top surface requires cooling or heating for matching conditions for achieving high interfacial adhesion strength while printing, and will be ready to start printing the next layer. This combats the traditional problem faced pertaining to compatibility of adhesion characteristics—when 3D printing different materials. So, considering the scenario wherein temperature fails to match at the time of starting to print a new layer, a signal is sent to both the thermal camera controller 115 and the 3D printer controller 116 for the 3D printer to stop printing a new consecutive layer. When the desired temperature of the top surface is reached and measured by the real-time thermal camera 112, the printer resumes printing the consecutive layer.

The following steps elaborate the role of the control screen 107 in the printing process, in accordance with the present invention. First, the 3D printer is switched on and a sliced CAD file (of the multi-layered sandwich panel) is uploaded to the 3D printer. The control screen 107 is used to then set the temperature of each material to be used and subsequently, 3D printing commences. On completing the top surface of the first layer, the 3D printer controller 116 sends an order to the thermal camera 112 to measure the top surface of the first layer, if the temperature matches the conditions, the thermal camera controller 115 sends an order to the 3D printer controller 116 to continue printing the second layer. If the temperature does not match the conditions, the thermal camera controller 115 orders the 3D printer controller 116 to pause the 3D printing process, and to regulate the temperature of the top surface layer (by cooling or heating using an air blower which is attached with the 3D printer). The 3D printer is also equipped with a heater which is switched off in case the layer needs cooling only. When the temperature of the top surface matches the condition desired through the measured temperature by the thermal camera 112, the thermal camera controller 115 stops the cooling or heating process and triggers an order to the 3D printer controller 116 to continue the 3D printing process of the next layer. This process is continued for other layers until the last layer of the sandwich panel is printed.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:
1. A multi-layered and multi-material hyper-elastic three-dimensional (3D) sandwich panel comprising:
   a central composite rubber core stacked between an upper sandwich face layer and a lower sandwich face layer, wherein the upper sandwich face layer and the lower sandwich face layer are made of reinforced glass-fiber, and a transition layer present in between the upper sandwich face layer and the central composite rubber core for enhancing adhesion characteristics between the upper sandwich face layer and the central composite rubber core,
   wherein the transition layer and the upper sandwich face layer and the central composite rubber core are different materials,
   wherein the transition layer, central composite rubber core, the upper sandwich face layer and the lower sandwich face layer are 3D printed.

2. The multi-layered and multi-material hyper-elastic 3D sandwich panel of claim 1, wherein the central composite rubber core further comprises a core lower face layer, a central core layer and a core upper face layer.

3. The multi-layered and multi-material hyper-elastic 3D sandwich panel of claim 2, wherein the core lower face layer, the central core layer and the core upper face layer are made of rubber or a flexible rubber-like material, to ensure hyper elasticity properties and an ability to maintain shape when no load is placed on the 3D sandwich panel.

4. The multi-layered and multi-material hyper-elastic 3D sandwich panel of claim 1, wherein the lower and upper sandwich face layers are made of reinforced materials such as fiber glass or carbon fiber reinforced polymers.

5. The multi-layered and multi-material hyper-elastic 3D sandwich panel of claim 4, wherein the transition layer material and the core upper face layer material are different and an interfacial surface between the transition layer and a surface of the core upper face layer comprises a low infill density of 10% to 50%.

6. The multi-layered and multi-material hyper-elastic 3D sandwich panel of claim 1, wherein 3D printing fusion deposition modelling (FDM) technology is used for manufacturing the hyper-elastic 3D sandwich panel.

7. The multi-layered and multi-material hyper-elastic 3D sandwich panel of claim 1, wherein a first FDM extruder nozzle and a second extruder nozzle are used for 3D printing a plurality of layers, one layer at a time, the plurality of layers comprising the central composite rubber core and the upper and lower sandwich face layers, and wherein the first FDM extruder nozzle prints the upper sandwich face layer and the lower sandwich face layer, and the second FDM extruder nozzle prints the central composite rubber core.

8. The multi-layered and multi-material hyper-elastic 3D sandwich panel of claim 1, wherein the central composite rubber core is made of a thermoplastic polymer.

9. The multi-layered and multi-material hyper-elastic 3D sandwich panel of claim 1, wherein the upper and lower sandwich face layers are made of glass-fiber reinforced nylon.

10. The multi-layered and multi-material hyper-elastic 3D sandwich panel of claim 2, wherein infill type is linear style when transitioning between the core lower face layer to the central core layer and from the central core layer to the core upper face layer.

11. The multi-layered and multi-material hyper-elastic 3D sandwich panel of claim 1, the hyper-elastic 3D sandwich panel comprising multiple core layers stacked in between the upper sandwich face layer and the lower sandwich face layer.

12. The multi-layered and multi-material hyper-elastic 3D sandwich panel of claim 2, wherein the transition layer is made of a different infill pattern than that of the core lower face layer, central core layer and the core upper face layer to achieve required adhesion properties between materials used for the upper sandwich face layer and the central composite rubber core.

13. The multi-layered and multi-material hyper-elastic 3D sandwich panel of claim 1, wherein the transition layer comprises a grid or triangular infill type.

* * * * *